United States Patent [19]

Vogt

[11] Patent Number: 4,878,641

[45] Date of Patent: Nov. 7, 1989

[54] EYEWEAR HOLDER

[76] Inventor: Paul A. Vogt, 1058 Ottawa Ave., West St. Paul, Minn. 55118

[21] Appl. No.: 211,999

[22] Filed: Jun. 27, 1988

[51] Int. Cl.⁴ .............................................. A47F 5/00
[52] U.S. Cl. .............................. 248/309.1; 24/17 AP; 24/457; 211/13; 211/89; 248/316.5; 248/902
[58] Field of Search ........... 248/DIG. 2, 309.1, 316.5, 248/74.3, 74.2, 231.8; 24/3 R, 3 C, 16 PB, 17 AP, 30 R, 30.5 P, 457, 547, 487; 211/89, 13, DIG. 129

[56] References Cited

U.S. PATENT DOCUMENTS

| | | | |
|---|---|---|---|
| 1,818,617 | 8/1931 | Grinwald | 248/231.8 X |
| 2,605,624 | 8/1952 | Halladay | 248/231.8 X |
| 2,879,967 | 3/1959 | Anderson | 248/315.5 |
| 3,515,363 | 6/1970 | Fisher | 248/74.3 X |
| 4,609,171 | 9/1986 | Matsui | 248/74.3 |
| 4,669,688 | 6/1987 | Itoh et al. | 248/74.3 X |
| 4,695,026 | 9/1987 | Medley, Jr. | 248/DIG. 2 X |

Primary Examiner—Ramon O. Ramirez
Attorney, Agent, or Firm—Douglas L. Tschida

[57] ABSTRACT

A clip-like holder for safely storing frame mounted eyewear. A fastener portion secures the holder to a variety of surfaces, while a flexibly resilient nosepiece/bridge support and restraint portion secures the eyewear to the holder. In various embodiments, the restraint comprises a resilient arm and/or a strap with mating fasteners secured to the holder body and strap. The fastener portion may comprise multi-sided adhesives, a resilient clip or the holder body may include a split bore for handlebar mounting.

9 Claims, 2 Drawing Sheets

EYEWEAR HOLDER

BACKGROUND OF THE INVENTION

The present invention relates to corrective lens supports and, in particular, to a discrete storage holder for supporting frame-mounted lenses from a variety of surfaces, be it a dashboard, sun visor or the handlebars of a bicycle or motorcycle.

While corrective lenses are a necessity for many people, they oftentimes present an annoyance when attempting to safely store the lenses in-between usage. This holds true not only for contact lenses, but particularly for frame-mounted reading and sunglasses.

Although a variety of storage holders have been developed over the years, predominantly such efforts have been directed to soft/hard-covered storage cases which are shaped to receive the glasses in an enclosed housing and protect the lenses against scratches or other physical abuse. Spring clips may be included with the cases for securing the case to a pocket or sun visor. Neck-worn tether cords have also found acceptance with wearer's concerned with misplacing or dropping their glasses.

Applicant is also aware of a variety of commercial storage racks typically including multiple pairs of bow receiving holes associated with a plurality of horizontally projecting nosepiece support arms. Such arms generally support the eyewear bridge piece and may also include a vertical restraint portion to prevent inadvertent dislodgement. Such racks however are designed to facilitate eyewear removal by the would-be customer, upon rotating the eyewear upward and withdrawing it from the rack, and do not normally encounter the types of abuse and jostling common to the present invention.

With the exception of the foregoing floor displays and comparable wall-mounted supports, Applicant is unaware of any type of unitary support which might be adapted to a variety of flat or curvilinear surfaces for temporarily storing a single pair of eyeglasses, when not in use. Applicant accordingly believes a need exists for a storage holder compatibly mounting to a variety of surfaces whereby individual pairs of eyeglasses may be restrained to the surface without fear of scratching or otherwise damaging the lenses in-between usage. Preferably such a holder might also support and associated carrycase.

SUMMARY OF THE INVENTION

In appreciation of the need for the foregoing holder and the shortcomings of available holders, Applicant has developed a variety of alternatively configured storage holders for restrainedly securing a pair of eyeglasses to an automotive or boat dashboard/sun visor or the handlebars of a bicycle or motorcycle, among a variety of possible surfaces.

It is accordingly a primary object of the invention to provide for a storage holder having a fastener or attachment portion compatible with a variety of flat and curvilinear support surfaces.

It is another object of the invention to provide for a holder having a restraint portion which captures and secures the eyeglasses thereto, yet readily permits detachment.

It is a further object to provide a holder which accommodates a variety of frame styles and sizes.

It is a still further object of the invention to provide for a holder which may be constructed as a single piece part, except possibly for the mechanical restraint portion, to minimize cost.

Various of the above objects, advantages and distinctions of the invention are particularly achieved in a number of alternative constructions developed by Applicant. In one such embodiment, a molded rubber/plastic storage holder is molded to provide for a flat mounting surface whereat an adhesive-backed fastener and/or wherethrough suitable mechanical fasteners may extend or a resilient inverted U-shaped clip projects.

Projecting from the fastener portion is a flexibly resilient nosepiece/bridge support and from the nosepiece support portion of which a restraint portion curves upward and back on itself in relation to the holder body to restrainedly capture the eyeglasses. In various embodiments, the durometer of the holder material and/or restraint portion shape is selected to control the restraint force and prevent undue flexing. In one embodiment, an aft extending barb prevents undesired dislodgement. In other embodiments, the restraint portion includes a latch member which mates with the holder body. In various other embodiments, the restraint portion comprises a flexible fastener containing strap or band which wraps about separate nosepiece and bridge supports before mounting to the holder body.

Also formed into the upper face of the support body is a bridge support which prevents rotation of the eyeglasses and supports same in a defined planar relation to the mounting surface. Slotted channelways in the body also receive suitably sized plugs which vary the restraint area of the support.

Yet another feature provided in various alternative embodiments is a split bored support body which clipmounts to a tubular surface such as the handlebar of a bicycle or motorcycle.

The foregoing objects, advantages and distinctions of the invention, among others, as well as its detailed construction, will become more apparent hereinafter upon reference to the following description thereof with respect to the appended drawings. Before referring thereto, it is to be appreciated the following description is made by way of the presently preferred and alternative embodiments only, which should not be interpreted in limitation of the spirit and scope of the invention as claimed hereinafter. To the extent modifications or enhancements have been contemplated, they are described as appropriate.

DESCRIPTION OF THE PREFERRED EMBODIMENT

Figure 1:
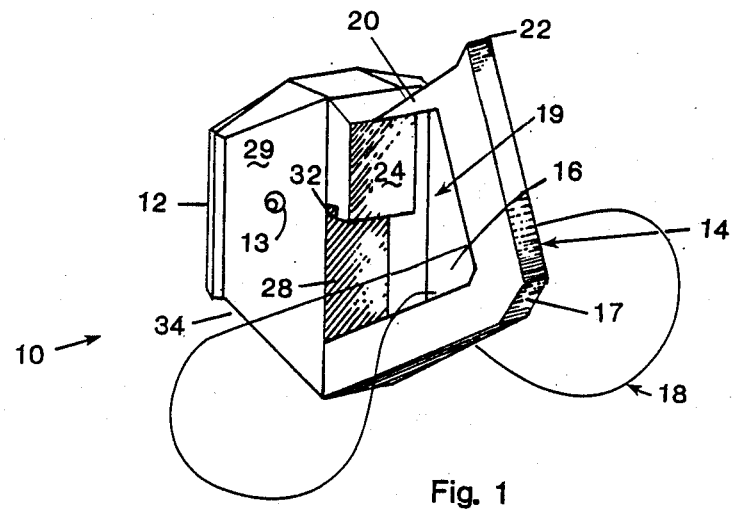
FIG. 1 shows an isometric view of an adhesive-backed holder with a flexible, barbed restraint arm.

Referring to FIG. 1, an isometric view is shown of a presently preferred, adhesive backed storage holder 10. Generally, the rear surface of the holder 10 is formed to be compatible with the intended mounting surface and includes an adhesive backing or fastener portion 12 mounted thereto. Alternatively, mechanical fasteners such as screws (not shown) may be mounted through one or more apertures 13 to secure the holder 10 to the mounting surface.

Projecting from a lower front center surface of the holder 10 is a flexibly resilient support or restraint arm 14 which has a cross-sectional shape compatible with the nosepiece/bridge 16 of a pair of eyeglasses 18 (shown in outline). A lower portion 15 of the restraint arm 14 projects upwardly at an angle to a forwardmost vertical transition 17, where the arm 14 turns back on itself to a point adjacent to or contacting the upper end of the holder 10 to define a support aperture 19.

For the embodiment of FIG. 1, a pair of distal end barbed members 20 and 22 respectively prevent undesired vertical movement of the restrained eyeglasses 18 and provide a finger catch for flexing and restraint arm 14.

Figure 4:
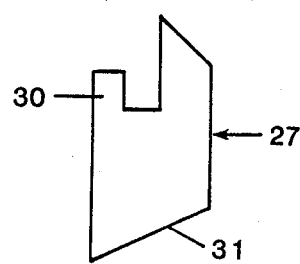
FIG. 4 show an alternative slide plug mountable in the holder of FIG. 1.
Figure 3:
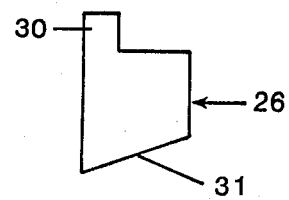
FIG. 3 shows a slide plug mountable in the holder of FIG. 1.

An upper forwardly extending surface 24 of the holder 10 is formed to support the bridge piece of the eyeglasses 18, although glasses of FIG. 1 as depicted do not contact this surface. An intermediate filler plug 26 receiving slide recess 28 between the restraint arm 14 and bridge support 24 permits an adjustment of the size of the support aperture 19 to accommodate a variety of frame sizes and shapes therebetween. Some filler plug members 26 and 27 which laterally slide mount in the recess 28 are shown in FIGS. 3 and 4. Each includes a projection 30 which mates with an offset portion 32 of the recess 28 and an angular bottom surface 31 to mate with the arm 14 and provide a dovetail fit.

The shape of the front face of the plugs 26, 27 may be varied to fill more or less of the aperture 19. Depending upon the type of eyeglasses 18 to be mounted to the holder 10, the tension applied by the restraint arm 14 against the eyeglass frame is thus controllable. For example, for a heavily framed pair of glasses 18, the plug member 26, 27 may be removed, which allows the eyeglasses to nest within the recess 28 and reduce the tension on the frames. Otherwise, for wire framed eyewear, a plug like plug 27, which fills more of the aperture 19, might be required.

The embodiments of FIGS. 1 to 7 are particularly molded from a polyethylene or rubber material of a suitable durometer. The material durometer is selected to provide for a sufficient compressive force at the restraint arm 14 to properly maintain the mounted orientation of the eyeglasses and minimize undesired detachment, such as with normal road vibration and/or jostling and to provide a durable arm lift. Such materials also find ready application with injection molding processes and have sufficient shape retention properties which are maintainable when exposed to ultraviolet light and heat.

In passing, it might also be noted that the holder 10 is approximately 1 to ½ inches wide, 1½ to 2½ inches tall and that the restraint arm projects approximately 1½ to 2 inches from the mounting surface. The holder body 29 is approximately ½ inch thick and the restraint arm 14 is approximately ¼ inch thick. The recess 28 is approximately 1 to 1¼ inches deep without a plug 26 or 27 and ¾ to 1 inch deep with a plug. The foregoing dimensions are however illustrative only of a presently preferred embodiment and may be appropriately changed as necessary to accommodate a variety of different types and sizes of eyeglasses.

Whereas, too, the exterior edge surfaces of the fastener portion 12 and restraint arm 14 are generally square, they may be variously chamferred or rounded, as desired. Moreover, in lieu of the depicted L-shaped restraint arm 14, an arcuate shaped arm 14 might be used. It is also to be noted, a slight undercut 34 is provided beneath the arm 14 relative to the rear mounting surface which reduces the material required to fabricate each holder 10 and makes the arm 14 more or less flexible, depending upon the amount of undercut.

Relative to the rear surface of the holder body 29, a two-faced adhesive member 12, again, extends from the holder. Alternatively, a slight recess 110 (reference FIG. 7) might be formed in the holder 10's rear surface to receive the member 12 and reduce the separation of the holder 10 from the support surface. The apertures 13, when necessary, also permit use of mechanical fasteners, such as screws, rivets or the like, to secure the holder 10 to the mounting surface. Two flared pegs integrally projecting from the rear surface with annular ridges (not shown) might be used equally well.

Figure 2:
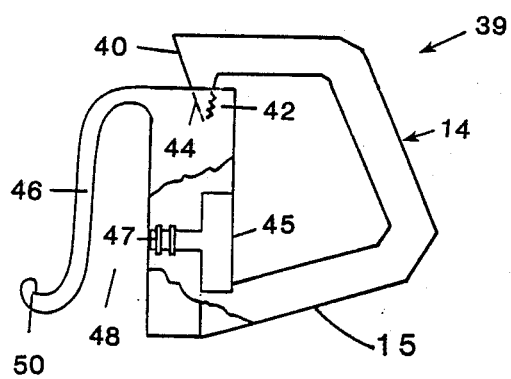
FIG. 2 shows a front elevation view of a visor mount holder wherein the restraint arm latches with the support body.
Figure 6:
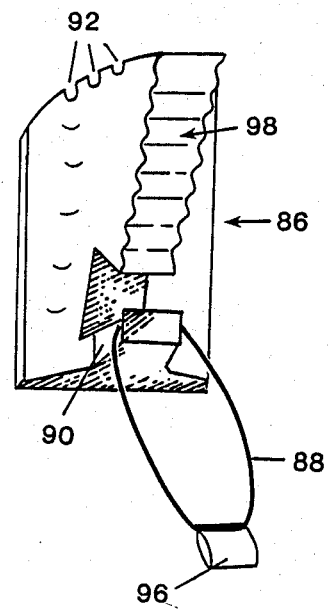
FIG. 6 shows an isometric view of a wall mount holder including a band-grab tongue restraint.
Figure 7:
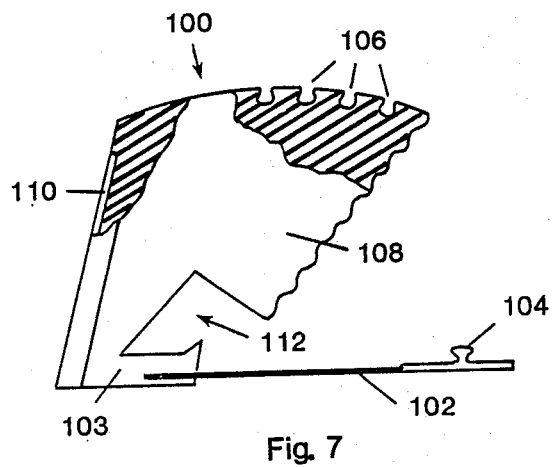
FIG. 7 shows a front elevation view of a holder like that of FIG. 6 including mating snap fasteners.

With further attention directed to FIG. 2, another embodiment or holder 39 similar to that of FIG. 1 is shown, but wherein the length of the arm 14 is extended and the distal bar 40 is formed to cooperatively mate with at least one notch 44 on the upper surface of the holder 10 in a latched fashion. Specifically, the barb 40 is provided with a plurality of sawtooth ridges 42 on its inner end surface which mate with a plurality of sawtooth ridges on the inner surface of the holder notch 44. The curvature of the restraint arm 14 is also such that the arm and ridged end resiliently contact one another and whereby the spring tension from the arm 14 is maintained to secure the undercut sawtooth ridges 42 and notch 44 with one another. Depending upon the construction and the types of eyeglasses to be stored, one or more notches 44 may be provided. Although, too, one particular latch mounting is shown, it is to be appreciated a variety of other latched mountings might similarly be accommodated by appropriately forming the distal end of the restraint arm. Several of such constructions are shown in FIGS. 5 to 7.

The holder 39 is also formed to include a plug 45 having a ridged mounting plug 47 extending form its rear surface. A resilient clip arm 46 also extends from the holder's rear mounting surface and permits a removable mounting of the holder 39 to a sun visor, etc. An inverted U-shaped mounting channel 48 is particularly formed between the clip 46 and rear of the holder 39. An end tang 50 facilitates deflection of the clip arm 46 during mounting/release.

Figure 5:
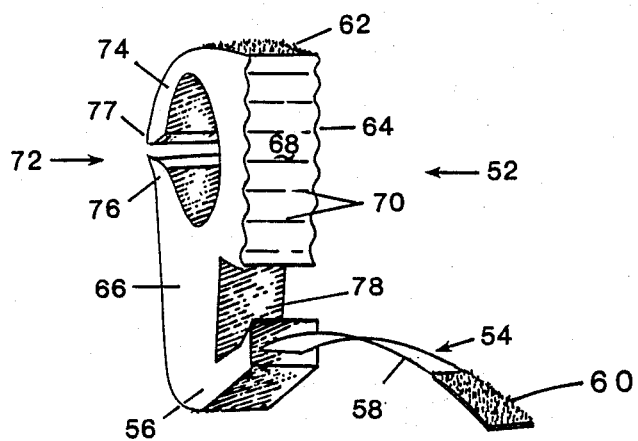
FIG. 5 shows an isometric view of a handlebar-compatible holder having a flexible restraint strap.

FIG. 5 shows another holder 52 wherein a modified restraint arm 54 is provided. Specifically, the restraint arm 54 includes a rigid, outwardly extending lower support portion 56 which, as before, supports the nosepiece of the eyeglasses 18. A strap member 58 having an end-mounted Velcro TM fastener tab piece 60 secured to its extreme end extends from the portion 56. A mating Velcro TM tab 62 mounted to the upper surface of the bridge piece 64 secures the strap 58 to the holder 52.

The bridge piece 64 of the holder of FIG. 5 is also formed to project forward at an upwardly tapering angle to the holder body 66 and provide a greater amount of body material than the embodiments of FIGS. 1 and 2. The forward face 68 of the bridge piece 64 also contains a plurality of ridges 70 which in combination with the taper better accommodate a variety of larger framed eyeglasses 18 and maintain the eyeglass lenses in planar relation to the support surface.

Attention is also directed to the body 66 of the holder 72 of FIG. 5 which provides for an aperture 72 defined between upper and lower arm portions 74 and 76. Upon separating the arms 74, 76, the holder 72 may be mounted to the handlebars of a bicycle or motorcycle. Generally therefore, the arm portions 74, 76 are shaped to provide an undersized bore opening relative to a typical pair of handlebars and whereby the surrounding arm portions 74, 76 grasp the handlebar and restrain the holder thereto. The distal end 77 of one or both of the arms 74, 76 provides a finger grab to facilitate removal of the holder from the handlebars. In passing, it is also to be appreciated that in lieu of a pair of clamp fingers 74, 76, a second strap restraint 54 might extend from the rear of the holder to secure the holder 72 to the handlebars. In essence therefore back-to-back restraints are provided with the body portions 74, 76 fastening the holder to the vehicle and the strap portion 54 securing the eyeglasses thereto.

Also provided is a V-shaped recess 78 for again slide receiving a mating plug (not shown) to control the mounting of the eyeglasses.

With attention next directed to FIG. 6, a wall mount holder 86 similar to that of FIG. 5 is shown, but wherein a band strap 88 which extends from the lower support arm 90 to mount in one of a plurality of mating grooves 92 formed in the upper surface of the holder. In particular, a rigid tongue 96 secured to the end of the band 88 mates with a selected one of the grooves 92 to cooperate with one another and provide for a length-adjustable tether action. The strap 88 may be formed of either a rigid or flexible material which relative to the tapered bridge piece 98 can be tailored to control the restraint tension.

Lastly, FIG. 7 shows another wall mount holder 100 like that of FIGS. 5 and 6, wherein the restraint strap 102 extends from the support arm 103, but includes a mushroom-shaped snap member 104. The member 104 mates with holes 106 (shown in cutaway) let into the upper surface of the bridge 108. Also shown in partial cutaway is the earlier mentioned surface recess 110 whereat an adhesive backing 12 can be mounted. The shape of the dove-tailed recess 122 is also more apparent.

While the present invention has been described with respect to a number of presently preferred and alternative embodiments, it is to be appreciated that still other embodiments and modifications thereto might be suggested to those of skill in the art. Accordingly, it is contemplated that the following claims should be interpreted to include all those equivalent embodiments within the spirit and scope of the invention.

What is claimed is:

1. Eyewear storage apparatus comprising:
a body member including a fastener portion mountable to a support surface and a resilient eyewear restraint portion integrally molded with said body member and having a distal end projecting outward relative to said body member to define an eyewear receiving space therebetween, wherein said body member in the region of said eyewear receiving space includes an inwardly extending recess and a plug member detachably mounting to said recess, and wherein said restraint portion is resiliently biased to upon deflection release eyewear contained in the space between said restraint member and body member.

2. Apparatus as set forth in claim 1 wherein the distal end of said restraint portion includes at least one barbed projection.

3. Apparatus as set forth in claim 2 wherein said restraint portion includes first and second barbed projections and wherein said body member includes at least one recess mating with said first barb projection such that said first barb member may be releasably restrained to said body member and release therefrom upon deflecting said second bar member.

4. Apparatus as set forth in claim 1 wherein said recess comprises a dovetail slot.

5. Apparatus as set forth in claim 1 wherein said restraint portion comprises a strap member extending from a lower end of said body member and includes a distal fastener portion mating with a fastener portion secured to a surface of said body member.

6. Apparatus as set forth in claim 1 wherein said body member includes a plurality of apertures therethrough and fastener means for securing said body member to a support surface.

7. Apparatus as set forth in claim 1 wherein said fastener portion comprises a second arcuate projection which resiliently extends fron said body member to compressively grasp a support surface between the fastener portion and the body member.

8. Eyewear storage apparatus comprising:
a body member including first and second resilient arm portions 1 each integrally formed with said body member to arcuately project from the body member with a distal end mounting in adjacent relation to said body member, wherein said first arm portion relative to said body member projects from a first surface to define an eyewear receiving space and compressively engage eyewear positioned in the space, wherein said body member includes means for detachably securing a plug member in the region of said eyewear receiving space and wherein the second arm portion relative to said body member projects from a second surface different from the first surface and deflects to compressively secure said body member to a support member.

9. Eyewear storage apparatus comprising:
a body member including first and second resilient arm portions integrally formed with said body member to arcuately project from opposite surfaces of said body member with a distal end mounting in adjacent relation to said body member, wherein said first arm portion relative to said body member defines an eyewear receiving space and includes an inwardly extending recess and plug member detachably mounting to said recess and wherein said first arm portion compressively engages eyewear positioned in the space and the second arm portion relative to said body member deflects to compressively secure said body member to a support surface.

* * * * *